(12) United States Patent
Mevissen

(10) Patent No.: US 7,685,303 B2
(45) Date of Patent: Mar. 23, 2010

(54) OBJECT-ORIENTED DISCOVERY FRAMEWORK

(75) Inventor: Ron Mevissen, Kerkrade (NL)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 11/358,600

(22) Filed: Feb. 21, 2006

(65) Prior Publication Data

US 2007/0198732 A1    Aug. 23, 2007

(51) Int. Cl.
*G06F 15/173* (2006.01)
*G06F 15/16* (2006.01)
*H04L 12/28* (2006.01)
*G06F 17/30* (2006.01)

(52) U.S. Cl. .................. 709/230; 709/224; 709/226; 370/254; 707/1; 707/3

(58) Field of Classification Search ......... 709/223–226, 709/201–204, 220, 218, 230; 370/250, 254, 370/54, 229; 707/10, 3–5, 1
See application file for complete search history.

(56) References Cited

U.S. PATENT DOCUMENTS

| | | | |
|---|---|---|---|
| 5,185,860 A * | 2/1993 | Wu | 709/224 |
| 6,182,136 B1 * | 1/2001 | Ramanathan et al. | 709/224 |
| 6,286,047 B1 * | 9/2001 | Ramanathan et al. | 709/224 |
| 6,834,298 B1 * | 12/2004 | Singer et al. | 709/220 |
| 6,834,303 B1 * | 12/2004 | Garg et al. | 709/224 |
| 2002/0083143 A1 | 6/2002 | Cheng | |
| 2002/0091857 A1 * | 7/2002 | Conrad et al. | 709/238 |
| 2002/0099814 A1 * | 7/2002 | Mastrianni | 709/224 |
| 2002/0143944 A1 * | 10/2002 | Traversat et al. | 709/225 |
| 2004/0068565 A1 * | 4/2004 | Polan et al. | 709/226 |

OTHER PUBLICATIONS

International Search Report dated Jun. 28, 2007 for Application No. PCT/US2007/002464, 7 pages.

* cited by examiner

*Primary Examiner*—Quang N. Nguyen
*Assistant Examiner*—Benjamin M Thieu

(57) ABSTRACT

An object-oriented programming framework allows developers to write applications for services and devices that are automatically "discoverable" by applications associated with other devices and services on a network. An attribute is added to a class in an application or web service object and an associated, generic discoverable base class is appended to the application to make the application discoverable on the network. The discovery framework imposes minimal requirements on the application in which it is embedded, so nearly every application can be converted into a "discoverable" application. The discovery protocol-dependent details are hidden from the application itself, so exchanging the discovery protocol can be done without affecting the application.

20 Claims, 5 Drawing Sheets

OBJECT-ORIENTED DISCOVERY FRAMEWORK

BACKGROUND OF THE INVENTION

Dynamically discovering devices and web services on a computer network is a common problem, especially in networks where devices are regularly coming and going, for example, networks with portable devices. The problem lies both within recognizing a new devices added to the network and in identifying devices already connected to the network to the new devices. In general, the address (e.g., the internet protocol (IP) address) of each device must be known in order to connect with the device. If the address is written on the device or on an associated information document, this address can be manually recorded with the other devices on the network.

There are also a variety of methods or algorithms, generally called "discovery protocols," for automatically solving this problem. WS-Discovery (WS-D) is becoming a popular one now, and there are a number of others that are in use. Although these methods describe how to discover devices on a network, the methods are often error-prone and quite difficult for developers to implement properly, especially for devices or services that want to be discovered.

There are many discovery protocols (e.g. Universal Plug and Play (UPnP), WS-D) that are all wire-line level protocol. Hence, these protocols define the format and sequence of messages being transported, but none defines a programming interface for an application that wants to embed such a discovery protocol, i.e., an application that wants to become discoverable or use discovery to find other discoverable components. As a result, an application designer is often required to design a library specifically for that protocol, which also often requires changing the program flow to encompass that specific protocol. Another concern is that changing the discovery protocol (e.g., from UPnP to WSDP) causes major rework for the application designer even if the functionality of the new discovery protocol is similar or identical to the old one.

SUMMARY

A programming framework allows developers to write applications for services and devices that are automatically "discoverable" by applications associated with other devices and services on the network. The complexity problems of discovery are alleviated by providing an object-oriented framework that abstracts the discovery protocol-specific issues from the actual application, and enables a developer to simply derive/base an application or web service object from/on a generic discoverable class, configure it by appending attributes to the application to make the application discoverable on the network. This allows an application designer to embed a discovery process without requiring detailed knowledge of any particular discovery process or protocol. Discovery is achieved by basing the application or web service object on a discoverable class and adding a simple notation or attribute to an application or object. This small inclusion minimizes implications on the process flow and programming logic of the application.

With the discovery framework, the application designer needs to know only the minimal discovery related concepts and no protocol details. This allows any application designer to embed a discovery process into an application with no additional learning and design costs. The discovery framework imposes minimal requirements on the application in which it is embedded, so nearly every application can be converted into a "discoverable" application. The discovery protocol-dependent details are hidden from the application itself, so exchanging the discovery protocol can be done without affecting the application. This reduces maintenance and testing costs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

Figure 1:
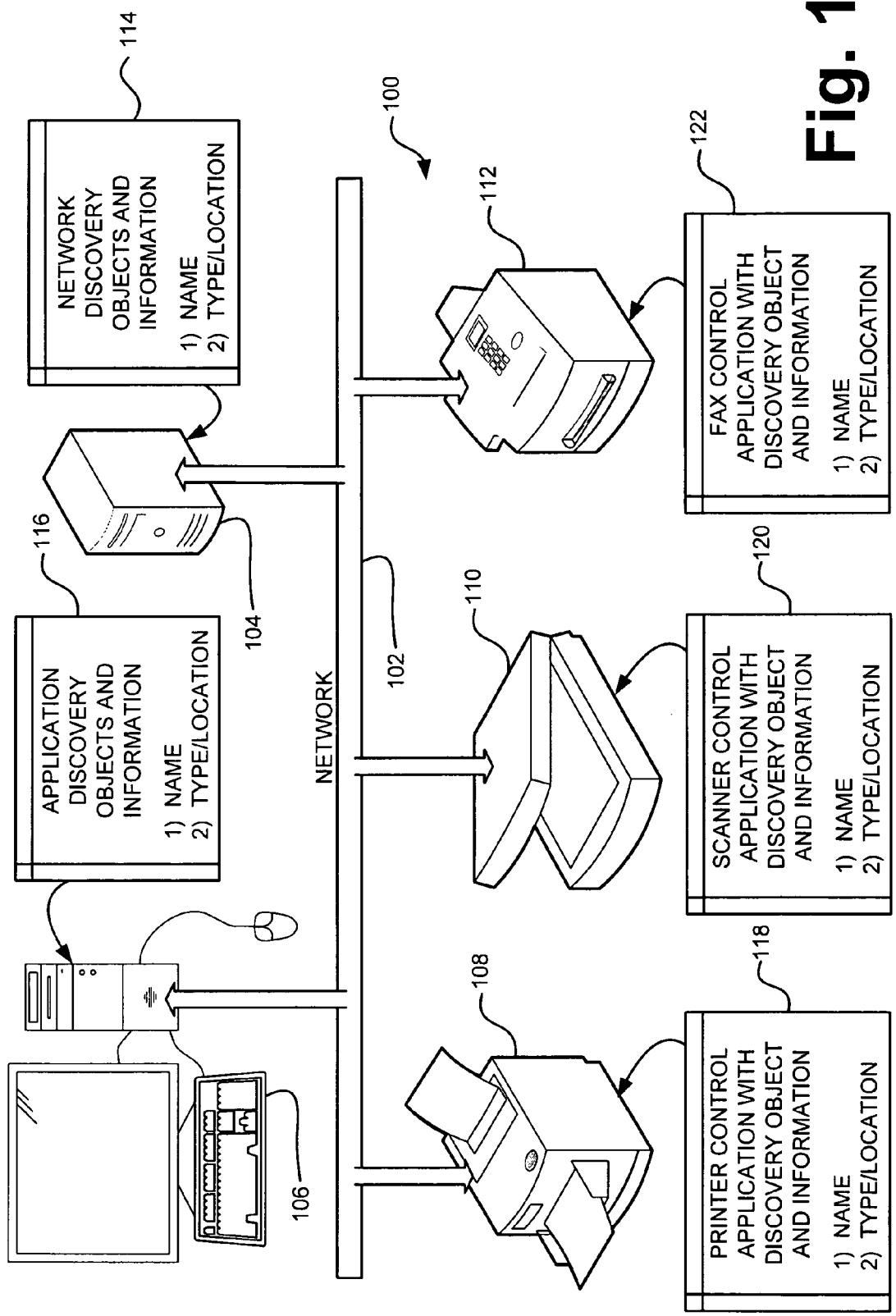
FIG. 1 is a schematic diagram of a computer network employing a discovery framework as described herein.

"Discovery" is a general term for one of many protocols for identification and interface with devices, applications, and services on a computer network. The concept of discovery in a networked computer system 100 is illustrated in FIG. 1. The computer system 100 is typical of local area network (LAN) in an office or business environment. However, discovery is not limited to a business LAN and is a protocol implemented on any network, local or wide or virtual, wired or wireless.

In FIG. 1 a network 102, for example, an Ethernet network, connects a central server computer 104, for example, a file server, to one or more client computers 106. The network allows the client computers 106 to interact with the server computer 104, for example, to retrieve files or applications accessible by multiple users or to connect with an external network, for example, the Internet, in the common instance that the central server computer 104 acts as a gateway to other networks.

Other components and devices are also connected to the network 102 to allow all client computer 106 connected to the network 102 access to the devices or services provided thereby. Typical devices that may be attached to the network 102 may include a printer 108, a scanner 110, and a facsimile transmission machine (fax) 112 as shown in FIG. 1.

In order for a client computer 106 to interact with another device on the network 102, for example, with the printer 108 by sending a document to be printed, the client computer 106 must first be able to locate the printer 108, i.e., the client computer 106 must know the address of the printer 108. Further, even if the client computer 106 knows the address of the printer 108, the client computer 106 must also know how to talk to the printer 108 to send data and instructions for printing, i.e., the client computer 106 and the printer 108 must speak the same language.

Most application software today is written using object-oriented programming language. According to the presently described implementation, each of the devices attached to the network 102 may be provided with a discovery class that is appended as part of the application software controlling the particular device. When an application program is instantiated, the discovery class creates a discovery object particular to the application. The discovery object announces the instantiation of the application to any other device or application also presently instantiated and connected with the network.

As shown in FIG. 1, each device connected to the network includes a corresponding application with discovery object. Application software controlling the peripheral devices connected to the network 102 may include a discovery class that creates a discovery object upon instantiation. For example, the printer 108 may be controlled by a printer control application with a discovery object 118; the scanner 110 may be controlled by a scanner control application with an associated discovery object 120; and the fax 110 may be controlled by a fax control application with a corresponding discovery object 122.

The discovery object may be included, not only in an application controlling a peripheral device like the printer 108, but in any application that controls a device in any way, for example, word processing software running on the client computer 106. Thus, each application running on a client computer 106 may have an associated discovery object 116. Similarly, network applications running on the server computer 104 may include network discovery objects 114 when those network applications are instantiated.

Figure 2:
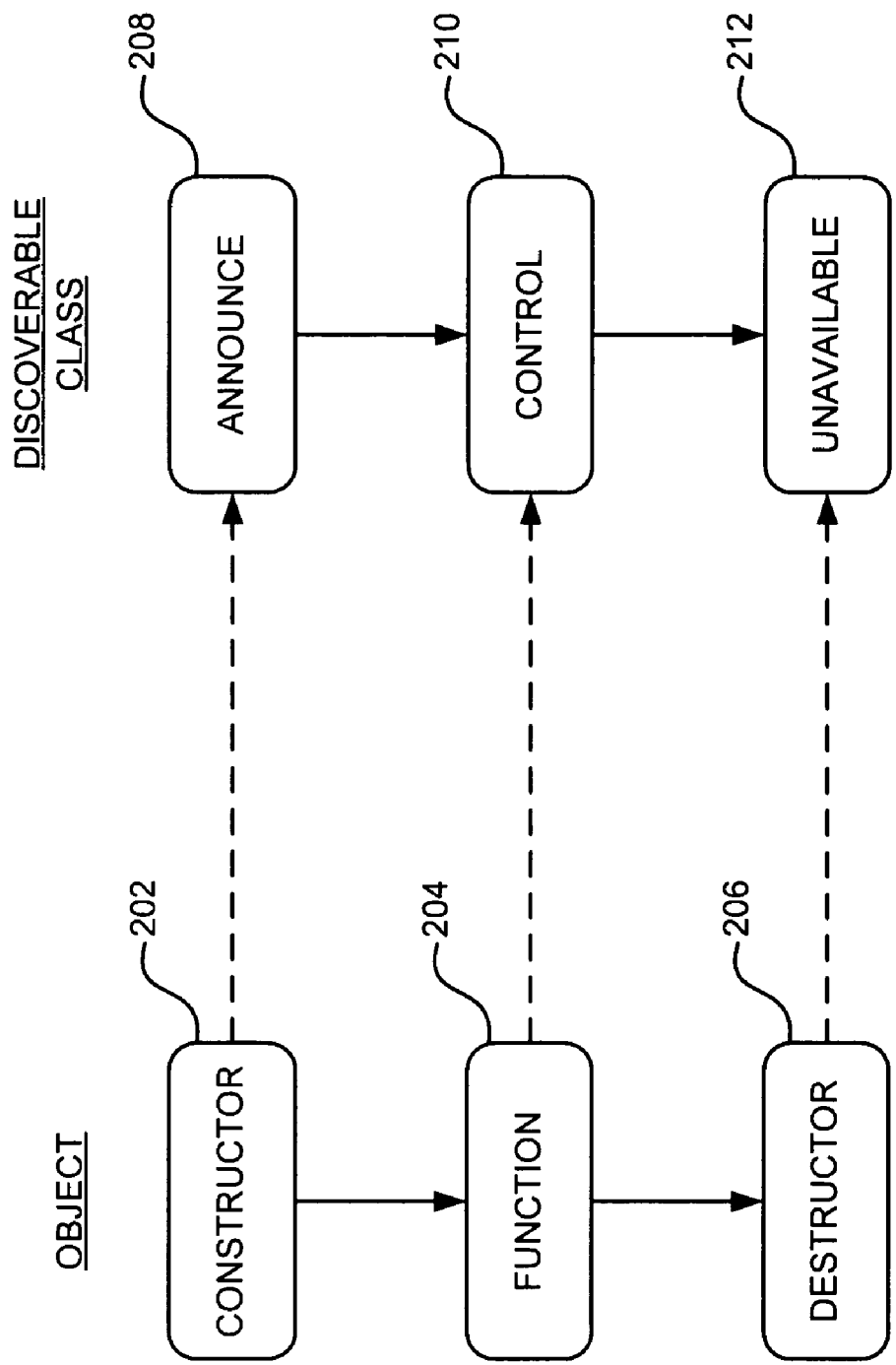
FIG. 2 is a schematic diagram comparing an object-oriented programming structure to the discovery framework described herein.

The schematic diagram in FIG. 2 shows a relationship between the states of an arbitrary object and a discovery object associated with an application controlling a device or other component to make that component discoverable. In general, an arbitrary object has a lifecycle. A constructor 202 creates a new instance (or object) of the class. It initializes all the variables and does any work necessary to prepare the object to be used. Once an object is instantiated, it remains in a functional state 204 wherein one or more methods in the object may be called by the object or other objects to perform any functions defined by the methods. A destructor 206 is called after an object is created when it is no longer needed. The destructor 206 terminates the functions of the object and may, for example, remove the object from system memory to free space for other operations.

This relationship to object-oriented programming is exploited in the discovery framework by providing a base class (usable in languages like C++, C#, VB, J#, and others), for example, "DISCOVERABLECLASS." Any application that wants to become discoverable, and thus make its associated device discoverable, can base a class on DISCOVERABLECLASS. In this manner, when objects are created upon instantiation of the application, an instance of DISCOVERABLECLASS is created, i.e., a discovery object becomes part of the functioning application.

The discovery object first sends a service protocol specific announcement 208 to the network. The announcement 208 is thus a function performed by the constructor 202 that automatically occurs upon instantiation of a class. Once instantiated, a discovery object is generally in a control state 210, e.g., wherein the methods 204 control another application or device or provide an interface to allow control of the discovery object by another application or device. For example, a control application for a printer may receive commands to print from an application on a client computer. The printer is controlled and the client computer application is the controller. The discovery object of the client computer application uses discovery identification information to locate the discovery object associated with the printer. Once the discovery object associated with the printer is found, it provides the communication address. This communication address can then be used by the client application to send control messages to the printer. When the discovery object is destroyed (either explicitly or implicitly by a garbage collector), the destructor 206 sends a leaving, sign-off, or unavailable notice 112 to the network.

An example of an arbitrary, exemplary class (in .net c# code) is set forth below.

```
namespace TestApplication
{
    public class TestApplication
    {
        public TestApplication( )
        {
        }
        public string HelloWorld( )
        {
            return "Hello World";
        }
    }
}
```

The "TESTAPPLICATION" class merely returns the string of words "Hello World" if the class is instantiated and the object is called.

The simple addition of identification information to the exemplary class enables this class or associated application to be discovered by other applications that include the DISCOVERABLECLASS class (the bolded lines indicate the modifications).

```
namespace TestApplication
{
    [DiscoverableInterface("iInterface1")]
    [DiscoverableNamespace("urn:microsoft.test")]
    public class TestApplication : DiscoverableClass
    {
        public TestApplication( )
        {
        }
        [ControlMethod]
        public string HelloWorld( )
        {
            return "Hello World";
        }
    }
}
```

The TESTAPPLICATION class is now based upon DISCOVERABLECLASS so that DISCOVERABLECLASS is now associated with and instantiated when TestApplication is instantiated. "CONTROLMETHOD" is an attribute (standard in Microsoft.net) that indicates that the HelloWorld method is exposed as a control method to client applications and thus becomes part of the interface of such applications.

The exemplary attributes "DISCOVERABLEINTERFACE" and "DISCOVERABLENAMESPACE" are used to identify or characterize and locate an application or device on a network. Such attributes are represented in FIG. 1 by the identification information labeled for the associated device. This identification information is represented in each of the network discovery object 114, any client application discovery object 116, the printer discovery object 118, the scanner discovery object 120, and the fax discovery object 122 as "name" and "type" or "location" information.

In the TestApplication class example above, DISCOVERABLEINTERFACE holds the value "iInterface1," which represents an arbitrary device type characterization. For example, if the device is a printer, the characterization may merely be "printer;" alternately is if the device is a DVD drive, the characterization may be "DVDInterface." Similarly, in the example above, DISCOVERABLENAMESPACE holds the value "urn:microsoft.test," which is a uniform resource identifier, here representing an arbitrary association with a particular manufacturer's product. For example, multiple printers on the network may be distinguished from other printers by an associated model or manufacturer identification. Alternately, the DISCOVERABLENAMESPACE may be a location, for example, a fixed IP address or a network location, e.g., "Bob's Office". It may be appropriate to submit characterization attributes and some actual values, for example, product specific values, to a standards organization to ensure uniformity in identification of devices and applications.

It should be apparent that any number of one or more identification or characterization attributes may be included in a class to identify the corresponding application or device to the network. By applying these changes to the exemplary class, which are class attributes having no effect on the programming logic, the exemplary class is made discoverable on the network. Thus, as in the example provided by the augmented TESTAPPLICATION class code above, other applications in the network can find the exemplary class by searching for a service that implements the interface named "iInterface1" in the "urn:microsoft.test" world.

Figure 3:
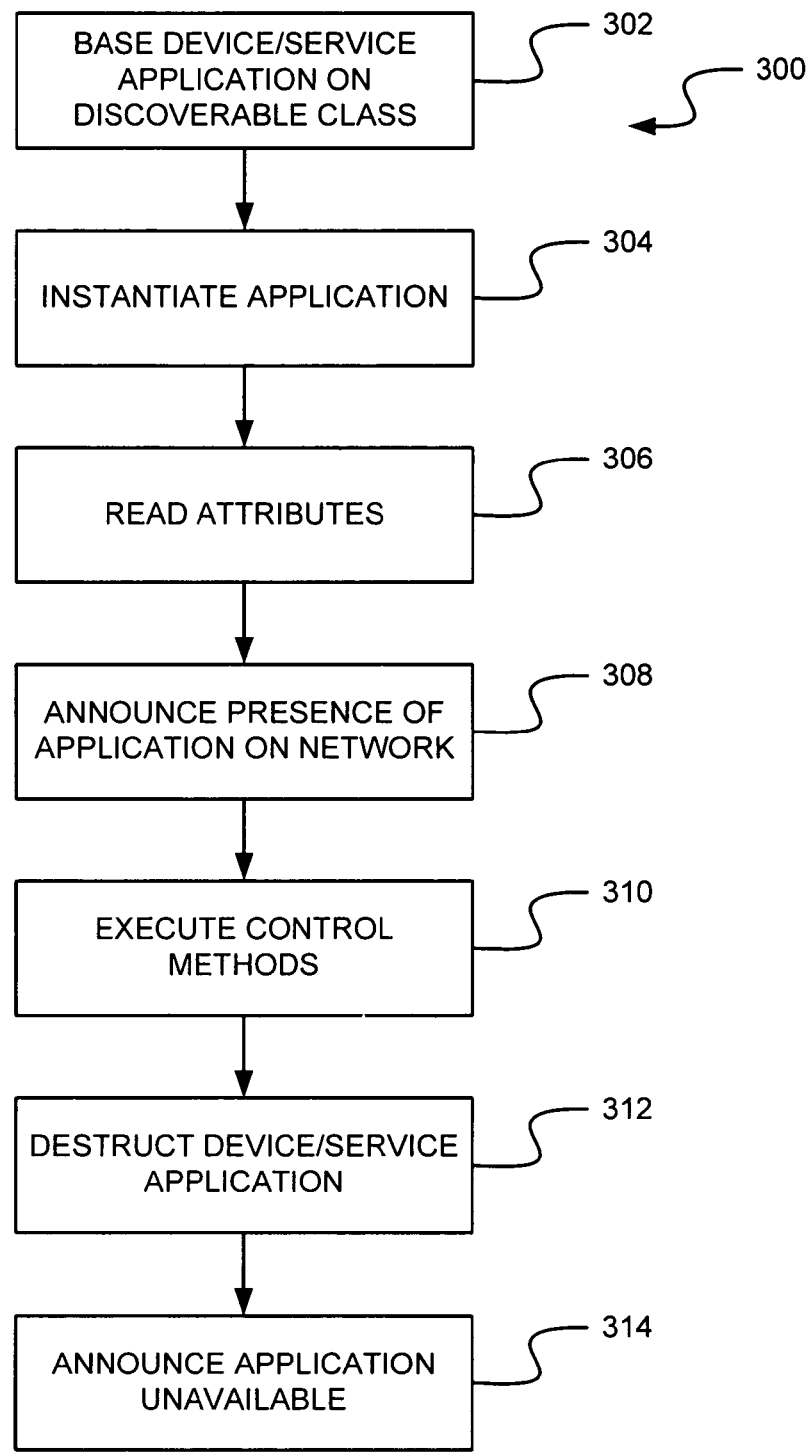
FIG. 3 is a flow diagram of a series of discovery operations performed upon instantiation of a discovery class in order to make devices and services discoverable on a network.

FIG. 3 depicts a series of exemplary discovery operations 300 performed upon instantiation of a discovery class in order to make devices and services discoverable on a network. Initially, in a base operation 302, a device or service application is based, at least in part, on a discoverable class. In an instantiation operation 304, the application instantiates and correspondingly creates an instance of the discovery class, i.e., a discovery object. The discovery object reads identification and characterization attributes in a reading operation 306. These attributes are placed innocuously in the application code by the designer as described above.

The discovery object next announces the presence of the application on the network in an announcement operation 308. For example, in the case of a printer, the discovery object will broadcast the characteristics, e.g., identification and location information of the printer to the network. Other applications on the network can store the characteristic information of the announcing application, for example, in a lookup table, while the announcing application is instantiated. In this way, other applications can later address control function requests to the announcing application. Once an application is instantiated, standard methods (e.g., Web Services) can be used to execute control methods in a control operation 310 generated either by the application itself, of by other applications on the network.

When the application terminates in a destruction operation 312, the discovery object further announces the unavailability of the application to the network in a final announcement operation 314. Upon receipt of an unavailability announcement, the instances of the discovery class functioning in other applications on the network can update their register of applications on the network to remove the destructing application as unavailable. In this manner, the object-oriented discovery framework common to each of the applications on the network dynamically updates the available devices or services on the network at any given time.

Figure 4:
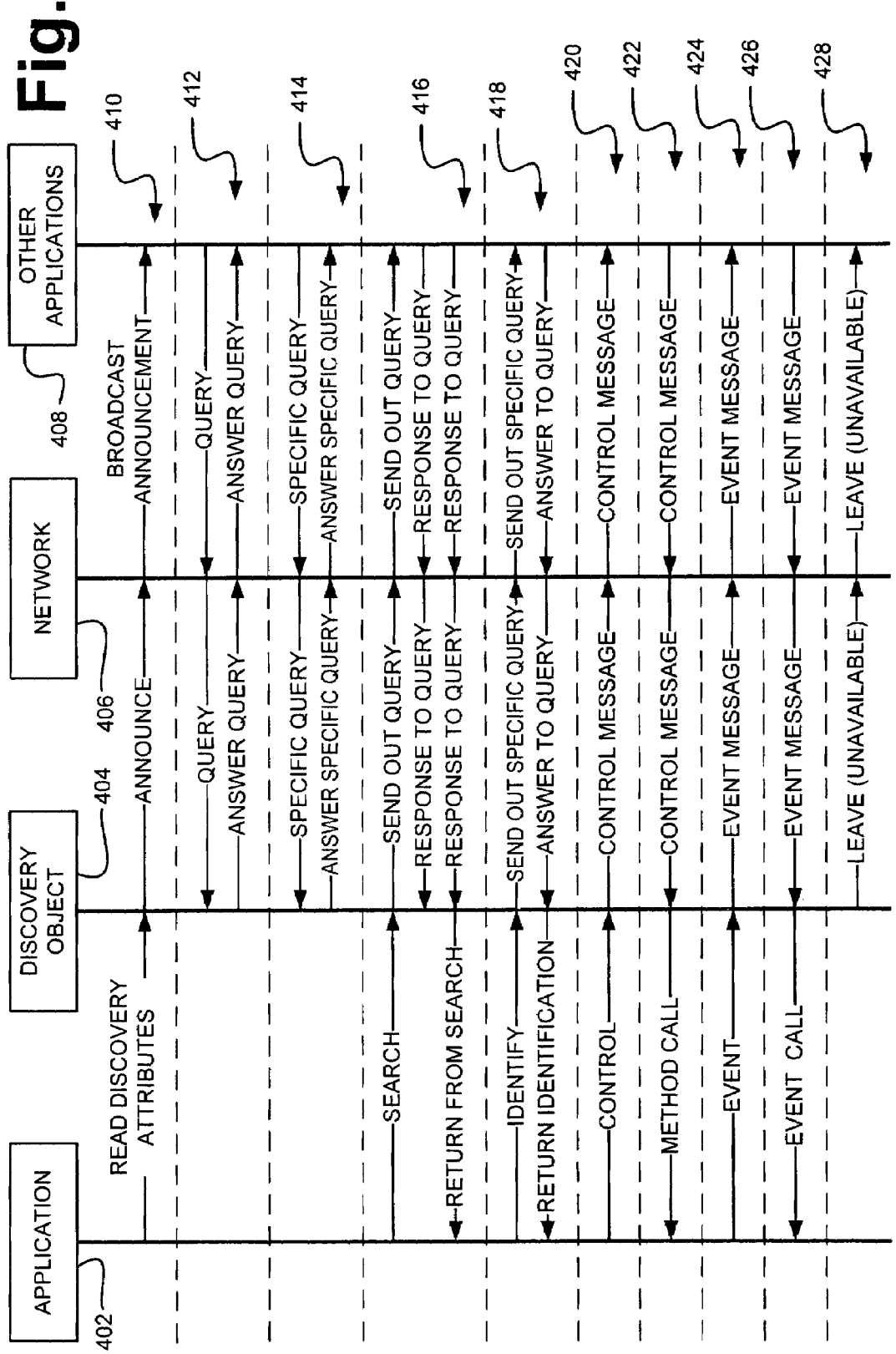
FIG. 4 is a schematic diagram of the interface between an application, a discoverable class, a network, and other applications.

An exemplary discovery interface between an application 402, a discovery object 404, a network 406, and other applications 408 connected to the network 406 is depicted in FIG. 4. The diagram of FIG. 4 provides a representative overview of common discovery methods and the relationship to an application using the object-oriented discovery framework described herein.

The methods are shown as separate threads of discovery functions or events. Each thread is separated by a dashed line. As described above, the application's class may be based on the DISCOVERABLECLASS provided by the discovery framework. The DISCOVERABLECLASS may be specific to a particular discovery protocol, for example, UPnP or WS-D, or it may be written generically to work with multiple protocols that may be implemented to control devices or services on any given network. The class further includes some discovery attributes like DISCOVERABLEINTERFACE and DISCOVERABLENAMESPACE. Note, an application does not need to include these attributes if it wants to use the discovery framework only to discover other discoverable components, while remaining anonymous to the network.

In the first thread 410, the application 402 is started and the application's class is created. The application's class is based on the DISCOVERABLECLASS, which causes an instance of DISCOVERABLECLASS, the discovery object 404, to be created as well. When the discovery object 404 is created, it reads the discovery attributes from the application class (e.g., DISCOVERABLEINTERFACE and DISCOVERABLENAMESPACE) and stores the attributes. The discovery object 404 constructor then generates a discovery protocol specific announcement using the discovery attributes and passes the announcement to the network 406. The announcement is then broadcast over the network 406 to the other applications 408 on the network.

The application 402 is now in the "instantiated" state and performs its normal functions. In the second thread 412, the discovery object 404 receives an incoming discovery protocol specific query from another application 408 over the network 406. The discovery object 404 accesses the discovery attributes saved in the previous creation step so it can handle the query without interrupting the normal function of the application 402. The discovery object 404 can determine to answer the query (as shown) or not, depending on whether the characteristic attributes in the incoming request query match the attributes of the application 402 held by the discovery object 404.

The same protocol is followed by the discovery framework for a specific query, which is represented in the third thread 414 of FIG. 4. A specific query differs from a normal query in that it is send directly towards the application 402 over the network 406 as opposed to broadcasting the query to the entire network 406. A specific query is used, for example, if the address of a discoverable application 402 is known but not other discovery attributes. The discovery object 404 can directly answer the specific query by providing any additional discovery attributes held by the discovery object 404 upon instantiation.

In fourth thread 416 the application 402 may need to discover another component or application on the network 406. To facilitate this need, the discovery framework provides a "search" function that uses parameters similar to the discovery attributes. The discovery object 404 generates a discovery protocol specific query using the parameters of the discovery framework and passes the query to the network 406 where the query is broadcast to all other applications 408 on the network. Any responses to the query are passed from the other applications 408 over the network 406 to the discovery object 404. The discovery object 404 collects all the responses to the query (or waits until a timeout) and returns the responses to the application 402 as result of the search function.

The discovery framework also provides a function to retrieve the discovery attributes of a known discoverable component or application on the network as shown in the fifth thread 418. Upon a request from the application 402 to identify another application or component on the network 406, the discovery object 404 generates a discovery protocol specific query and sends it over the network 406 to a specific address of another application 408 on the network 406. The discovery object 404 then waits for a reply (or timeout) and returns any discovery attributes in response to the specific query received from the other application 048 over the network 406 to the application 402.

Control of a discoverable application or component is also facilitated by the discovery framework. Control is generally provided by standard mechanisms (e.g., Web Services) through proxy code generated at the time of application design for a discoverable application or component. At design time, a programming tool is used that generates a proxy class (i.e., code that maps control messages to classes and methods of the application 402) within the application 402 for a discoverable application or component. The sixth thread 420 depicts the application 402 using this class and its methods to interface with the discovery object 404 to retrieve characteristic information of the other applications 408 in order to transmit discovery protocol-specific control messages via the network 406 to control the other applications and related components 408.

Likewise, the discovery framework assists other applications or components with control of the application 402 as shown in the seventh thread 422. Control messages from other applications 408 received via the network 406 are mapped to functions exposed by the application or component. Functions are exposed by the application or component through the inclusion of an attribute identifying a particular method to call upon receipt of a control message, for example, a CONTROLMETHOD attribute as shown in the source code example above. When a control message is received, the discovery object 404 looks up the method that handles the particular control message and invokes the method to control the application 402.

Sending events is also supported by the discovery framework as shown in the eighth thread 424. An event is generally an asynchronous publish/subscribe notification to interested parties. For example, an event notification could pertain to shipping of an order or arrival of an e-mail. When an application 402 signals an event, the discovery object 404 is consulted for location characteristics, e.g., an address list, for communication of the event, which is broadcast over the network 406 to other applications 408 connected to the network 406.

The discovery framework further helps receipt of events as shown in the ninth thread 426 of FIG. 4. Receiving events is similar to the handling of control messages as described above with respect to the seventh thread 422. In the ninth thread 426, when the proxy code for the application 402 is created at design time, methods are generated for all events. The application 402 can thus base its own proxy class on the generated proxy class and choose which methods it wants to override. The discovery object 404 then maps incoming events messages from other applications 408 received over the network 406 to these methods, which are invoked in the application 402.

When the application is stopped the application's classes are destroyed. A destructor of the application 402 also causes the destruction of the discovery object 404 based upon the DISCOVERABLECLASS. In the final, tenth thread 428, the destructor of the discovery object 404 generates a discovery protocol-specific announcement indicating that the discoverable application 402 is leaving the network 406 and is no longer available. Pursuant to the discovery framework, upon receipt of this leaving message, discovery objects in other applications 408 can update related tables or other memory constructs to reflect that the application 402 is unavailable to prevent further queries or messages from being sent to the application 402.

Figure 5:
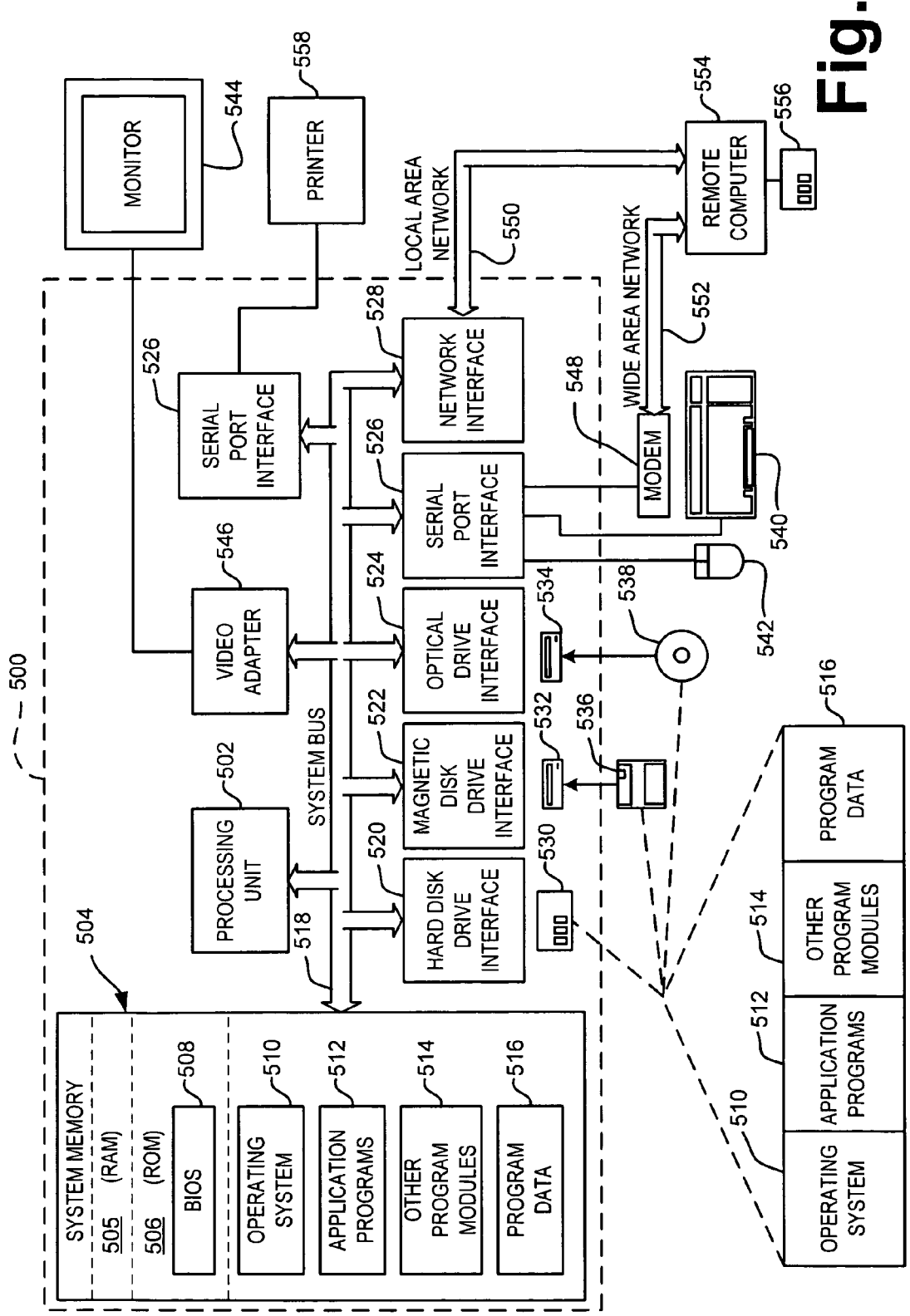
FIG. 5 is a schematic diagram of a general purpose computer system that may be used to implement the discovery framework.

The exemplary hardware and operating environment of FIG. 5 for implementing the invention includes a general purpose computing device in the form of a computer 500, including a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB).

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, which is one type of communications device. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

In an exemplary implementation, the DISCOVERABLECLASS may be incorporated as part of the operating system 510, application programs 512, or other program modules 514. State description files, object data values, and other data may be stored as program data 516.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer-implemented method for causing an object-oriented application to become discoverable on a network employing a discovery protocol, the computer-implemented method comprising:
   creating a generic discoverable base class that implements the discovery protocol;
   embedding the generic discoverable base class in a class of the object-oriented application;
   defining an attribute of the generic discoverable base class to identify the object-oriented application on the network; and
   introducing the attribute of the generic discoverable base class to a method of the object-oriented application,
   wherein:
      the class of the object-oriented application is created when the object-oriented application is instantiated on a computer,
      the created class of the object-oriented application is based on the generic discoverable class such that the generic discoverable base class is instantiated when the object-oriented application is instantiated,
      a discovery object particular to the object-oriented application is created upon instantiation of the generic discoverable base class, the discovery object comprising an instance of the generic discoverable base class that provides discovery identification information based on the defined attribute of the generic discoverable base class for allowing another application or device connected to the network to discover the object-oriented application,
      a value of the attribute is announced to the network, and
      the discovery object announces the unavailability of the object-oriented application to the network upon destruction of the object-oriented application.

2. The computer-implemented method of claim 1, wherein the attribute defines a characteristic of the object-oriented application to identify the object-oriented application on the network.

3. The computer-implemented method of claim 1, wherein the attribute defines a location of the object-oriented application to identify the object-oriented application on the network.

4. The computer-implemented method of claim 1, wherein upon instantiation the discovery object announces the availability of the object-oriented application to the network.

5. The computer-implemented method of claim 1, wherein the value of the attribute is announced to the network via a discovery protocol specific announcement.

6. The computer-implemented method of claim 1, wherein the discovery object invokes a method to control the object-oriented application in response to receiving a control message from another application via the network.

7. A computer-implemented method for implementing a discovery framework on a network comprising:
- basing a class of an object-oriented application on a generic discoverable base class that implements a discovery protocol by embedding the generic discoverable base class in the class of the object-oriented application;
- configuring a method of the object-oriented application to define an attribute of the generic discoverable base class for identifying the object-oriented application on the network;
- creating the class of the object-oriented application when the object-oriented application is instantiated on a computer, the created class of the object-oriented application being based on the generic discoverable base class;
- instantiating the generic discoverable base class upon instantiating the object-oriented application;
- creating a discovery object particular to the object-oriented application as an instance of the generic discoverable base class upon instantiation of the generic discoverable base class, the discovery object providing discovery identification information based on the defined attribute of the generic discoverable base class for allowing another application or device connected to the network to discover the object-oriented application;
- reading a value of the attribute of the generic discoverable base class from the method of the object-oriented application;
- broadcasting the value of the attribute over the network;
- handling discovery requests over the network to and from the object-oriented application via the discovery object; and
- upon termination of the object-oriented application, announcing the unavailability of the object-oriented application to the network and destructing the discovery object.

8. The computer-implemented method of claim 7, further comprising announcing the availability of the object-oriented application to the network.

9. The computer-implemented method of claim 8, further comprising:
- reading a plurality of attributes of the generic discoverable base class from the method of the object-oriented application;
- using the plurality of attributes to generate a discovery protocol specific announcement; and
- broadcasting the discovery protocol specific announcement over the network.

10. The computer-implemented method of claim 7, wherein the attribute defines a characteristic of the object-oriented application to identify the object-oriented application on the network.

11. The computer-implemented method of claim 7, wherein the attribute defines a location of the object-oriented application to identify the object-oriented application on the network.

12. The computer-implemented method of claim 7, further comprising invoking a method to control the object-oriented application in response to receiving a control message from another application via the network.

13. The computer-implemented method of claim 7, further comprising sending and receiving queries.

14. A computer-readable storage medium having computer-executable instructions stored thereon causing a computer to perform a process implementing the computer-implemented method of claim 7.

15. A computer-implemented method of communicating between a first application on a first client device on a network and a second application on a second client device on the network using a discovery protocol, the computer-implemented method comprising:
- instantiating the first application on the first client device;
- creating a class of the first application based on a generic discoverable base class that is embedded in the class of the first application and that implements the discovery protocol;
- instantiating the generic discoverable base class on the first client device when the first application is instantiated;
- creating a discovery object particular to the first application on the first client device upon instantiation of the generic discoverable base class, wherein:
  - a method of the first application includes an attribute of the generic discoverable base class defined to identify the first application,
  - the discovery object comprises an instance of the generic discoverable base class that provides discovery identification information based on the defined attribute of the generic discoverable base class for allowing another application or device connected to the network to discover the object-oriented application;
- reading a value of an attribute of the first application to determine a characteristic of the first application to announce;
- announcing the availability of the first application over the network to the second application; and
- announcing the unavailability of the first application over the network to the second application upon termination of the first application.

16. The computer-implemented method of claim 15 further comprising destructing the discovery object upon termination of the first application.

17. The computer-implemented method of claim 15 further comprising handling discovery queries over the network to and from the first application via the discovery object.

18. The computer-implemented method of claim 15, further comprising invoking a method to control the first application in response to receiving a control message from the second application via the network.

19. The computer-implemented method of claim 15, wherein the characteristic comprises a location of the first application on the network.

20. A computer-readable storage medium having computer-executable instructions stored thereon causing a computer to perform a process implementing the computer-implemented method of claim 15.

* * * * *